(12) United States Patent
Miller et al.

(10) Patent No.: US 10,319,174 B2
(45) Date of Patent: Jun. 11, 2019

(54) SYSTEM AND METHOD FOR ORDERING ITEMS

(75) Inventors: Joel Aaron Miller, Sandy Springs, GA (US); Michael Cain Finley, Roswell, GA (US); Steven J. Giera, Dacula, GA (US)

(73) Assignee: NCR Corporation, Atlanta, GA (US)

( * ) Notice: Subject to any disclaimer, the term of this patent is extended or adjusted under 35 U.S.C. 154(b) by 96 days.

(21) Appl. No.: 13/533,599

(22) Filed: Jun. 26, 2012

(65) Prior Publication Data

US 2013/0006776 A1    Jan. 3, 2013

Related U.S. Application Data

(60) Provisional application No. 61/503,108, filed on Jun. 30, 2011.

(51) Int. Cl.
| | |
|---|---|
| *G06Q 40/00* | (2012.01) |
| *G07F 13/02* | (2006.01) |
| *G06Q 20/32* | (2012.01) |
| *G06Q 20/20* | (2012.01) |
| *G06Q 30/02* | (2012.01) |

(52) U.S. Cl.
CPC ......... *G07F 13/025* (2013.01); *G06Q 20/202* (2013.01); *G06Q 20/3276* (2013.01); *G06Q 30/0209* (2013.01); *G06Q 30/0253* (2013.01)

(58) Field of Classification Search
CPC .................................................... G06Q 40/00
USPC ......................................................... 705/41
See application file for complete search history.

(56) References Cited

U.S. PATENT DOCUMENTS

| | | | |
|---|---|---|---|
| 6,070,156 A | 5/2000 | Hartsell, Jr. | |
| 6,193,154 B1 * | 2/2001 | Phillips et al. | ............... 235/381 |
| 6,999,943 B1 | 2/2006 | Johnson et al. | |
| 7,107,231 B1 * | 9/2006 | Hall et al. | .................. 705/14.61 |
| 7,155,199 B2 * | 12/2006 | Zalewski et al. | ............. 455/403 |
| 7,249,087 B2 | 7/2007 | Sharp et al. | |
| 7,637,365 B2 | 12/2009 | Ringdahl et al. | |
| 7,856,403 B2 | 12/2010 | Venturo et al. | |
| 8,328,083 B2 | 12/2012 | Suk | |
| 2001/0027422 A1 * | 10/2001 | Brandrud | ............... G06Q 20/04 705/26.9 |
| 2004/0030601 A1 * | 2/2004 | Pond | ...................... B67D 7/145 705/16 |

(Continued)

OTHER PUBLICATIONS

Specification as filed in U.S. Appl. No. 13/495,530 on Jun. 13, 2012.

(Continued)

*Primary Examiner* — Bruce I Ebersman
*Assistant Examiner* — John A Anderson
(74) *Attorney, Agent, or Firm* — Schwegman Lundberg & Woessner, P.A.

(57) ABSTRACT

Systems and methods allowing for a customer to initiate a fuel purchase transaction utilizing a mobile device are described. The customer may further be presented with advertisements on his mobile device and/or be provided with the opportunity to purchase additional items for inclusion on his fuel transaction. In some embodiments, the customer may pay for his transaction using mobile wallet information or other information associated with the mobile device. Alternatively, in some embodiments, the customer may pay for his transaction using input means of the fuel pump.

19 Claims, 3 Drawing Sheets

(56) References Cited

U.S. PATENT DOCUMENTS

| | | | |
|---|---|---|---|
| 2005/0004839 A1 | 1/2005 | Bakker | |
| 2005/0283405 A1* | 12/2005 | Mallo | G06O 30/02 |
| | | | 705/7.32 |
| 2006/0271431 A1 | 11/2006 | Wehr | |
| 2007/0198432 A1* | 8/2007 | Pitroda | G06Q 20/02 |
| | | | 705/64 |
| 2007/0225898 A1* | 9/2007 | Pfleging et al. | 701/201 |
| 2008/0195486 A1* | 8/2008 | Sopinsky | G06Q 20/105 |
| | | | 705/14.26 |
| 2010/0085244 A1 | 4/2010 | Hodge et al. | |
| 2012/0254280 A1* | 10/2012 | Parker, II | G06F 9/5044 |
| | | | 709/201 |
| 2012/0284105 A1 | 11/2012 | Lehmann | |
| 2013/0054470 A1* | 2/2013 | Campos et al. | 705/67 |

OTHER PUBLICATIONS

Non-Final Office Action dated Oct. 22, 2013 in pending U.S. Appl. No. 13/495,530.

Final Office Action dated Feb. 10, 2014 in pending U.S. Appl. No. 13/495,530.

* cited by examiner

SYSTEM AND METHOD FOR ORDERING ITEMS

CROSS-REFERENCE TO RELATED APPLICATIONS

This application claims priority to U.S. provisional application No. 61/503,108, filed Jun. 30, 2011, which is incorporated herein by reference

BACKGROUND OF THE INVENTION

Many fuel pumps (such as gasoline pumps used by ordinary consumers) are equipped with payment devices such as card readers to allow a customer to pay for fuel at the pump. In such prior-art systems, the customer typically interacts with the fuel pump by swiping a credit card or other card through the fuel pump's card reader to initiate the transaction. Such systems do not allow the customer to remotely initiate a transaction using a mobile device, however. Nor do such systems allow the customer to add additional items to the fuel transaction for purchase.

SUMMARY OF THE INVENTION

The systems and methods described herein allow for a customer to initiate a fuel purchase transaction utilizing a mobile device, such as a smart phone, tablet computer, laptop, or other mobile computing device. The customer may further be presented with advertisements on his mobile device and/or be provided with the opportunity to purchase additional items for inclusion on his fuel transaction. In some embodiments, the customer may pay for his transaction using mobile wallet information or other information associated with the mobile device. Alternatively, in some embodiments, the customer may pay for his transaction using input means of the fuel pump.

Advantageously for the merchant, the systems and methods described herein allow the merchant to make additional sales or advertise to customers who typically only purchase fuel and do not purchase any non-fuel items. Additionally, customers will no longer have to initiate two separate transactions for fuel and non-fuel purchases, respectively. For credit card transactions, this may result in substantial savings to the merchant because each credit card transaction usually incurs a separate per-transaction fee (in addition to any other fees) from the credit card processor. Thus, a merchant using the systems and methods described herein could cut the number of credit card transactions by up to 50% by encouraging customers to combine their fuel and non-fuel purchases into a single transaction.

DETAILED DESCRIPTION

Figure 1:
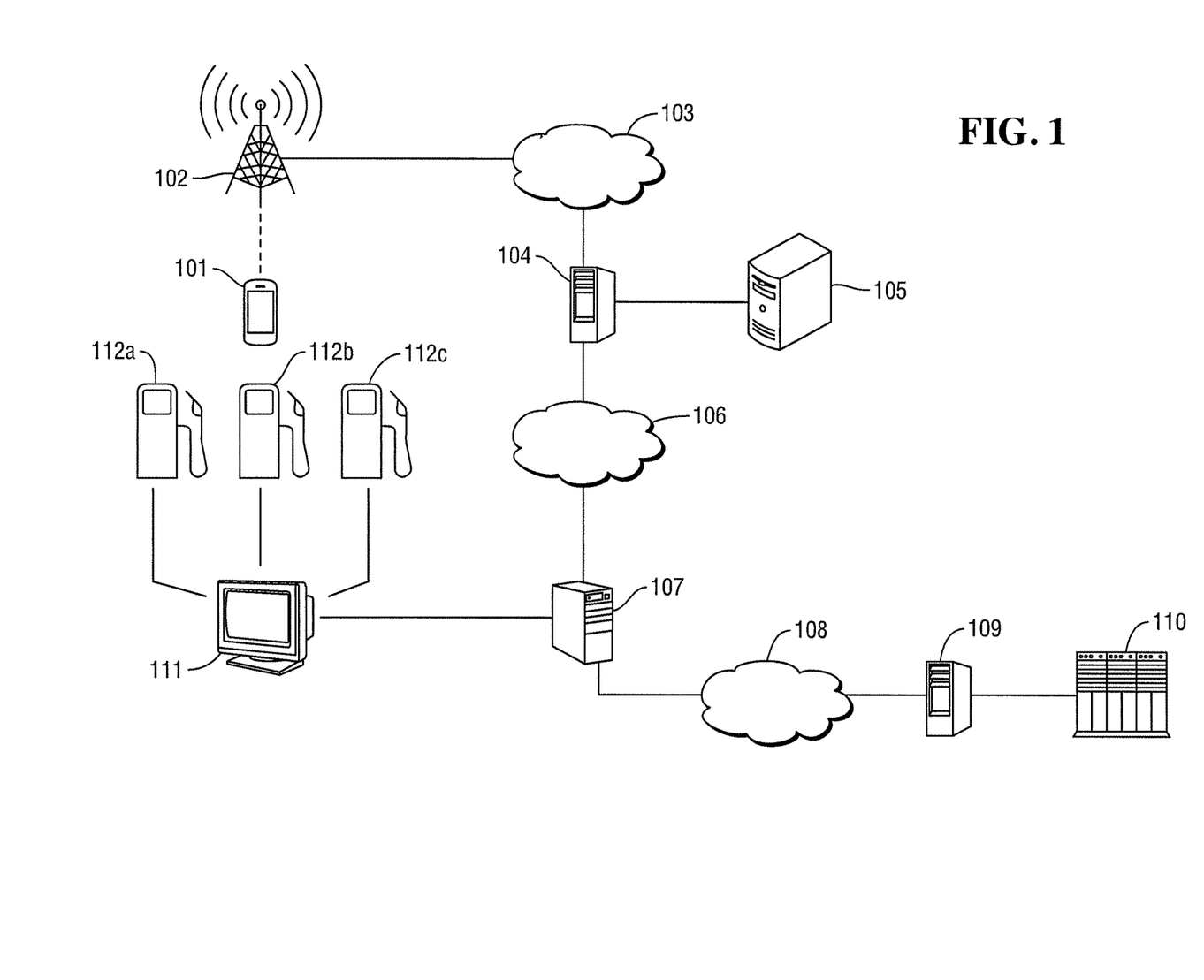
FIG. 1 shows a diagram of a system in one embodiment of the invention.

FIG. 1 shows a diagram of a system in one embodiment of the invention. The system comprises a mobile device 101 such as a smart phone, tablet computer, laptop, or other mobile computing device. Mobile device 101 is in communication with a cell tower 102 or other communications infrastructure which allows mobile device 101 to communicate with remote computing systems such as web server 105, payment server 110, or point-of-sale ("POS") terminal 111. Such communication preferably occurs over one or more communication networks 103, 106, 108. One or more of these communication networks 103, 106, 108 may comprise a public network such as the public internet. Alternatively, one or more of these communication networks 103, 106, 108 may comprise a private network. In some embodiments, two or more of these communication networks 103, 106, 108 may be combined into a single network. For example, in one embodiment, the public internet serves as a single communications network linking mobile device 101, web server 105, payment server 110, and POS terminal 111 together. Web server 105, payment server 110 and POS terminal 111 are preferably protected from the communications network(s) by firewalls 104, 109, and 107, respectively. POS terminal 111 is further connected to one or more fuel pumps 112a-112c. Each of the web server 105, payment server 110, and POS terminal 111 preferably comprises a processor or computing device enabled to process electronic signals.

Those skilled in the art will recognize that variations of the network topology shown in FIG. 1 are possible. For example, mobile device 101 could communicate with web server 105, payment server 110, and POS terminal 111 via a satellite network rather than cell tower 102. As another example, web server 105 could be co-located with POS terminal 111 and/or payment server 110.

Figure 2:
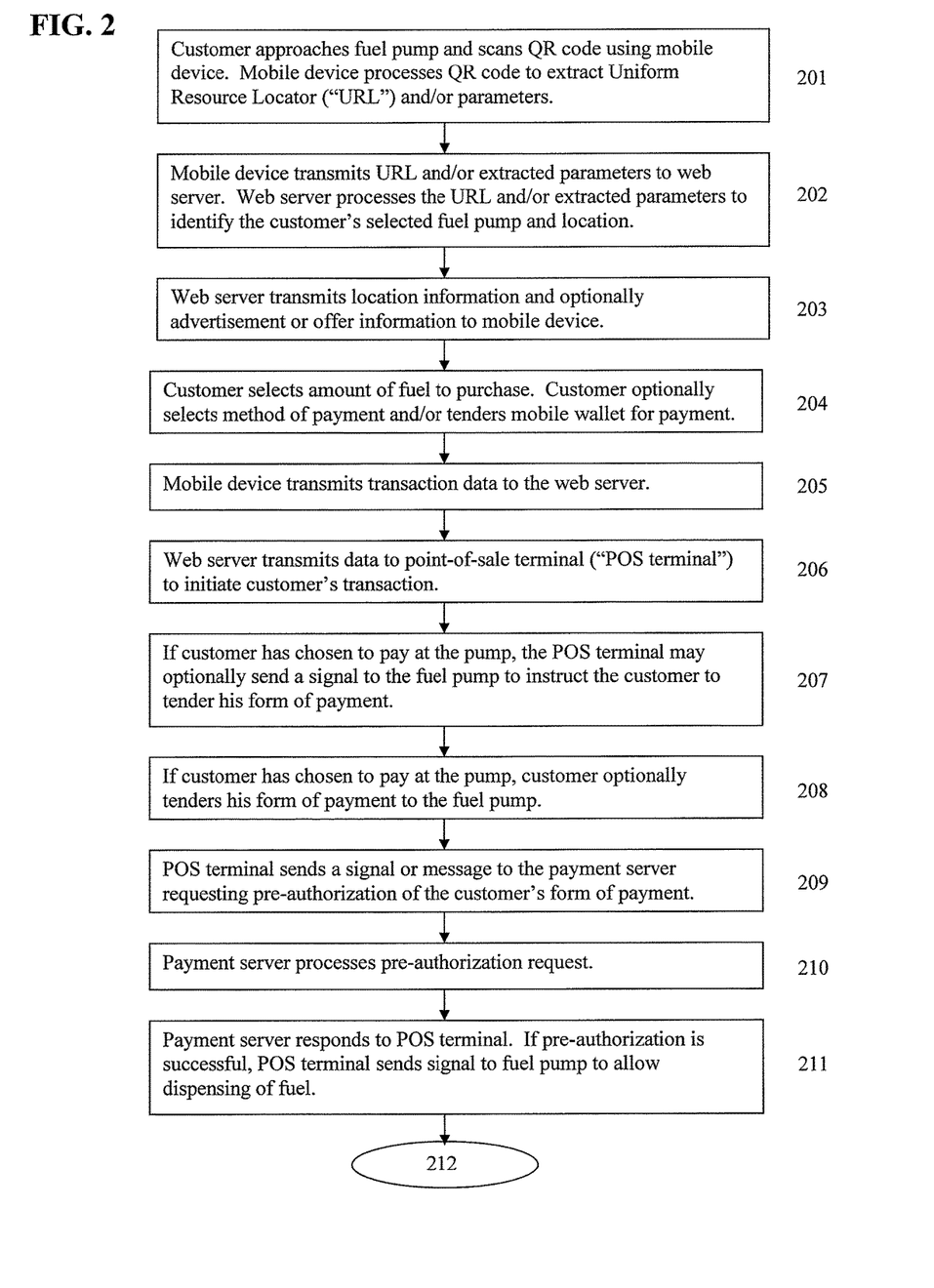
FIG. 2 shows one method for ordering items in conjunction with the system shown in FIG. 1.

Turning to FIG. 2, a method for ordering items is shown. At step 201, the customer approaches a fuel pump 112a to purchase fuel. The fuel pump 112a preferably has a sticker or otherwise displays a QR code that uniquely identifies the fuel pump 112a (including the store, merchant, or other location where the fuel pump 112a is located). As known to those of skill in the art, a QR code is a two-dimensional bar code capable of encoding data. In some embodiments, the QR code may be displayed on an electronic display of the fuel pump 112a. In such embodiments, the QR code can be easily changed. In some embodiments, other data encoding schemes and/or plain text can be used in place of the QR code.

In preferred embodiments, the QR code will encode a Uniform Resource Locator (URL). In addition to a domain name, the URL preferably comprises one or more parameters that uniquely identify fuel pump 112a. For example, the URL may comprise a merchant ID, a location ID, and a pump ID to uniquely identify fuel pump 112a. In another example, the URL may comprise a location ID and a pump ID. In yet another example, the URL may comprise a pump ID. Preferably, the URL will also be displayed in a human-readable plain text format next to or nearby the QR code.

In preferred embodiments, the QR code may comprise a unique ID that is unique across all fuel pumps that are part of the system described herein. Furthermore, the unique ID may be changed periodically or on an as-needed basis. For example, if the QR code that encodes a given unique ID is damaged (e.g., a sticker containing the QR code is torn, wears out, or is vandalized), then the merchant can replace the QR code sticker with another QR code sticker that encodes a second (and different) unique ID. In some embodiments, the merchant may have an inventory of replacement QR code stickers on hand for use in such situations. In other embodiments, the merchant may generate and print a QR code sticker for use in such situations. Along with affixing the replacement QR code sticker to the fuel pump 112a, the merchant would register the unique ID encoded by the QR code with a central database (not shown)

such that the replacement unique ID would be associated with the particular fuel pump 112a. In such a manner, fuel pump 112a would then be uniquely identified by the replacement unique ID encoded in the replacement QR code sticker.

After approaching the fuel pump 112a, the customer will scan the QR code using his mobile device 101. Preferably, the customer will use the camera or other built-in input device on the mobile device 101 to read the QR code. In some embodiments, the customer can alternatively enter in the URL manually using the key pad, touch screen, voice recognition software, or other input means of the mobile device 101. This method may be used, for example, if the QR code is obstructed, damaged, or unreadable or if the mobile device 101 is incapable of scanning QR codes.

After scanning the QR code (or manually entering the URL), the mobile device 101 will preferably analyze the URL to identify the domain name and the parameters encoded in the domain name. In some embodiments, the mobile device 101 may comprise a software application ("app") that is designed to facilitate the ordering method described herein. Such an app may preferably determine from the domain name of the URL that the URL is intended to be used with the app. For example, the domain name may be chosen by a particular merchant or vendor for use with the ordering method described herein. The app may further extract the parameter(s) from the URL that uniquely identify the chosen fuel pump 112a.

In other embodiments, the mobile device 101 may comprise a conventional web browser that is capable of processing the URL. In such embodiments, accessing the URL may cause the web browser to connect to the remote web server 105 to download a dedicated app to facilitate the ordering method described herein. In other embodiments, accessing the URL may cause the web browser to remotely execute the ordering method on the remote web server 105 and/or to execute the ordering method within the web browser.

At step 202, the app or web browser will communicate with web server 105 via cell tower 102 and communications network 103. The app or web browser will preferably transmit the complete URL (or the parameters extracted therefrom) to software that is running on the web server 105. The software running on web server 105 will preferably process the URL (or the extracted parameters) to uniquely identify the fuel pump 112a where the customer is located. For example, the web server 105 may utilize parameters for a merchant ID, a location ID, and a pump ID embedded in the URL to uniquely identify fuel pump 112a. In another example, the web server 105 may utilize the unique ID embedded in the URL to uniquely identify fuel pump 112a.

Once identified, the web server 105 will, at step 203, transmit information about the customer's location to the mobile device 101. For example, the web server 105 may return graphics, address information, or other location information related to the store or location where fuel pump 112a is located. The web server 105 may also return specific advertisements, interactive or static menus, and/or special offers related to the store where fuel pump 112a is located. In some embodiments, the app or web browser running on the customer's mobile device 101 may prompt the customer to verify that his location has been identified correctly. In some embodiments, the web server 105 may return information about the customer such as membership information, loyalty point balance, or the like.

At step 204, the customer selects an amount of currency for his fuel purchase and/or selects a "fill-up" (i.e., a complete tank of gasoline) on the input device of his mobile device 101. For example, in some embodiments, the touch screen of the mobile device 101 will display a series of dollar amounts such as $5, $10, $20, $25, and $50 for the customer to select. The touch screen may also display a selection for a fill-up. In such embodiments, the customer may select any dollar amount by pressing the corresponding number or select a fill-up by pressing the text showing a fill-up. In some embodiments, the customer may select an arbitrary amount such as $14.50 by entering the amount on the input device of the mobile device 101. In some embodiments, the mobile device 101 may present the customer with his previously set "favorite" currency amounts. That is, the customer may have previously selected the currency amount(s) that he typically likes to purchase. In some embodiments, the mobile device 101 may present the customer with his historical currency amounts, e.g. the currency amount(s) he chose in the preceding one or more transactions.

After choosing a payment amount, the customer will then optionally be prompted to select a method for payment. In some embodiments, the mobile device 101 will display a prompt asking whether the customer wishes to pay at the pump or utilize a mobile wallet affiliated with the customer and/or the mobile device 101. The customer will then select the desired choice using the input device of mobile device 101. As an example, the customer may be presented with a screen comprising two buttons: one to pay at the pump and one to pay using a mobile wallet. The customer may then choose the desired payment type by selecting the button on the touch screen of the mobile device 101. In some embodiments, the customer may be prompted for additional information such as a zip code, personal identification number ("PIN"), authorization code, loyalty account number, membership number, customer number, or other identifier.

In some embodiments, the customer may be prompted for additional wallet information if the customer chooses to pay by mobile wallet. In alternate embodiments, the customer may have a single default method of payment (such as pay-at-the-pump or pay using a mobile wallet) and the customer will not be presented with any payment options.

In some embodiments, the mobile wallet may be managed by a third party whereas in other embodiments the mobile wallet may be managed by the customer and/or resident solely on the customer's mobile device. In some embodiments, some or all of the mobile wallet information may be entered manually by the customer during the transaction. For example, the customer may manually enter his credit card number (plus expiration date, CVV code, and/or zip code) when requested for his mobile wallet information. In some embodiments, some or all of the mobile wallet information may have been stored on the customer's mobile device prior to initiation of the transaction and may be selected by the customer during the transaction. For example, the customer may have previously stored a particular credit card number to his mobile device and may select the stored credit card during the transaction.

In some embodiments, the customer may have the option to pay in cash following completion of the transaction. In such embodiments, the customer will preferably identify himself by entering a membership number, customer number, loyalty account number, or other identifier on his mobile device 101. This identification information may be required by the merchant to identify the customer and deter fraud (e.g., to prevent someone from selecting payment by cash and then failing to actually pay the merchant). In some embodiments, the membership number, customer number, loyalty account number, or other identifier will be pre-saved on the customer's mobile device 101 such that the customer does not have to enter the identification information during the transaction. In some embodiments, the identification information may be automatically transmitted to the web server 105 in step 205 without the customer's knowledge and/or without the customer having to select the identification information.

At step 205, the app or web browser on the mobile device 101 will communicate with the web server 105 to transmit data regarding the customer's transaction to the web server 105. Preferably, such data will include the amount of fuel selected by the customer for purchase. Such data will also preferably include the customer's form of payment, whether to pay at the pump, pay by mobile wallet, or pay in cash, e.g. The data may also include other information entered by the customer such as a zip code, personal identification number ("PIN"), authorization code, password, membership number, customer number, loyalty account number, and/or mobile wallet information. Such mobile wallet information may include a credit card number, debit card number, house account number, loyalty account information, expiration date, CVV code, or any other data necessary to electronically pay for the transaction. In some embodiments, the wallet information may be stored on the mobile device 101, a remote server (not shown), or otherwise pre-entered such that the wallet information is available for use in electronic transactions.

At step 206, the web server 105 will communicate with the POS terminal 111 to initiate the customer's transaction. Specifically, the web server 105 will utilize the unique identification information gathered in step 202 to locate the POS terminal 111 associated with fuel pump 112a. The web server 105 will then send a message or signal to the POS terminal 111 to initiate the customer's transaction, preferably including the amount of fuel (or fill-up) selected by the customer for purchase and whether the customer desires to pay at the pump or using his mobile wallet information. Optionally, the web server 105 may relay additional information about the customer's mobile wallet to the POS terminal 111.

If the customer has chosen to pay at the pump, the POS terminal 111 may, at step 207, send a signal to the fuel pump 112a to instruct the customer to tender his form of payment. For example, in some embodiments the POS terminal 111 will send a signal to the fuel pump 112a which will cause the fuel pump 112a to prompt the customer to swipe his credit card (or other payment card) in a card reader or other input device of the fuel pump 112a. Such a prompt may be displayed on a video display of the fuel pump 112a. Advantageously, this method of prompting the customer for payment can utilize the pre-existing hardware and software found in many fuel pumps today. In some embodiments, other input devices on fuel pump 112a (such as an RFID reader, proximity reader, keyboard, keypad, touch screen) may be used to automatically or manually enter the customer's payment information. In one embodiment, for example, the customer may manually enter his credit card information on a keypad or touch screen of the fuel pump 112a.

If the customer has chosen to pay at the pump, the customer may, at step 208, utilize an input device on the fuel pump 112a to tender his payment information in response to the message displayed in step 207. For example, the customer may swipe his credit card through a card reader on the fuel pump 112a. In some embodiments, the fuel pump 112a may prompt the customer for verification information such as a zip code, personal identification number ("PIN"), password, CVV code, or other authorization code. In response, the customer may utilize an input device of the fuel pump 112a (such as a keypad or touch screen) to enter the requested verification data. The fuel pump 112a then preferably relays the information to the POS terminal 111. In some embodiments, the customer may enter the verification information into his mobile device 101, which will then forward the verification information to web server 105 and on to POS terminal 111.

At step 209, the POS terminal 111 will preferably send a signal or message to the payment server 110 to initiate the payment pre-authorization process. Preferably, the signal or message will include data regarding the customer's form of payment and the amount of fuel selected for purchase. For example, if the customer selected a "fill-up" and chose to pay at the pump in step 204 and swiped his credit card and entered his zip code in step 208, the POS terminal 111 would relay that data to the payment server 110 to obtain a pre-authorization for the fuel purchase. In some embodiments, if the customer selects a fill-up in step 204, then the POS terminal 111 will seek to obtain pre-authorization for a large currency amount (e.g., $150) or a maximum currency amount in order to cover whatever amount of fuel the customer may pump from fuel pump 112a. As discussed in more detail below, this large pre-authorization amount will also permit the customer to add additional items to his transaction during the fueling process In another example, if the customer selected $10 worth of fuel and chose to pay by mobile wallet in step 204, the POS terminal 111 would relay that data to the payment server 110. In some embodiments, the POS terminal 111 will request a pre-authorization amount in excess of the amount of fuel selected by the customer. As discussed in more detail below, this excess pre-authorization amount ("overage") will permit the customer to add additional items to his transaction during the fueling process. In some embodiments, the overage may be a fixed amount such as $50. In other embodiments, the overage may be calculated to be the difference between a fixed or maximum pre-authorization amount ($150, e.g.) and the amount of fuel selected for purchase in step 204. For example, if the fixed pre-authorization amount were set to $150 and the customer elected to purchase $10 worth of fuel in step 204, then the overage would be $140. In some embodiments, the overage amount can be customized for each particular customer.

In some embodiments, the POS terminal 111 may send a message to the customer's mobile device 101 to query the customer to determine whether he wishes to apply a loyalty account balance towards the purchase of the fuel. If the customer selects that he does wish to apply his loyalty account balance towards the fuel purchase, the mobile device 101 will send the selection to the POS terminal 111. The POS terminal 111 may then process the loyalty account request itself or forward the request to a remote loyalty system (not shown).

In some embodiments, the POS terminal 111 will seek to obtain pre-authorization for an unlimited amount and/or omit steps 209-211 altogether. For example, if the customer has previously chosen to pay by cash in step 204, then the POS terminal 111 may omit step 209 in some embodiments. Alternatively, the POS terminal 111 may verify the customer's identity using the identity information submitted in step 204. As discussed above, this verification of the customer's identity may help the merchant deter fraud.

At step 210, the payment server 110 will process the pre-authorization request from the POS terminal 111 utilizing the data provided about the customer's form of payment (such as the customer's credit card number, debit card number, expiration date, CVV code, zip code, PIN number, etc.) In some embodiments, the payment server 110 may request additional information from the POS terminal 111 (such as a zip code or CVV code, e.g.) and the POS terminal 111 will relay the message to the customer by (1) sending a message to the fuel pump 112*a* to be displayed to the customer, and/or (2) sending a message to the web server 105 to be relayed to the customer's mobile device 101. The customer can then enter the requested data on an input device of the fuel pump 112*a* or on his mobile device 101. The data will then be relayed back to the POS terminal 111 which will forward the data to payment server 110.

At step 211, the payment server 110 will send a message to the POS terminal 111 indicating whether the transaction is authorized or not. If the transaction is not authorized, the POS terminal 111 will send a message to the fuel pump 112*a* and/or the mobile device 101 (via web server 105) indicating that the method of payment was declined. In some embodiments, the customer will be given the opportunity to enter another form of payment and/or select a lower amount of fuel for purchase. If the transaction is authorized by the payment server 110, then the POS terminal 111 will send a signal or message to the fuel pump 112*a* to permit the customer to begin fueling. In response, the fuel pump 112*a* will permit the dispensing of fuel and may also display a message to the customer stating that the customer can begin fueling. Preferably, the POS terminal 111 will also send a signal or message to web server 105 indicating that the transaction has been approved. Web server 105 will preferably forward the signal or message to mobile device 101 which may then display a message to the customer indicating that he can begin fueling.

At step 212, the customer will begin dispensing fuel using fuel pump 112*a*. During the fueling process, web server 105 may optionally transmit advertisement information to mobile device 101 in addition to, or in lieu of, the advertisement information sent in step 203. Alternatively, or in addition, mobile device 101 may be pre-loaded with advertisement information to be displayed to the customer.

In preferred embodiments, the advertisement information presented to the customer will include offers for products or services that the customer can add to his current fuel transaction. For example, the advertisement information may ask the customer if he wishes to purchase a car wash. In another example, the advertisement information may ask the customer if he wishes to purchase one or more food items for sale at the merchant's location. In some embodiments, the app or web page displayed on the customer's mobile device 101 may permit a high degree of interactivity such that the customer can browse multiple products or services, customize the products or services, and/or select the products or services for purchase along with the customer's fuel transaction.

In some embodiments, the app or web page on the customer's mobile device 101 may be configurable to only permit the ordering of additional goods or services based on the customer's form of payment. For example, if the customer's tendered form of payment is a "fuel-only" card or account, then the app or web page on the customer's mobile device 101 may be configured to deny the customer the opportunity to select additional items for purchase on the current fuel transaction. In such cases, the app or web page may display advertisement information but not permit the customer to add items to the fuel transaction for purchase. Alternatively, the app or web page may simply display a general informational message such as the merchant's logo and/or a message that the transaction is in progress.

In some embodiments, the web server 105 may transmit a game to the mobile device 101 in step 212 in addition to, or in lieu of, the advertising information. Alternatively, the mobile device 101 may be pre-loaded with a game and the game may be activated while the customer is pumping fuel. In some embodiments, the customer can earn loyalty points or discounts on fuel or other products by playing the game.

At step 213, the customer may optionally order one or more of the goods or services presented to him on his mobile device 101 utilizing an input device of the mobile device 101. As an example, the customer may choose to purchase a car wash and/or a sandwich using mobile device 101. After the customer has chosen his additional item(s) for purchase, the app or web page will transmit a message to the web server 105, which will relay the message to the POS terminal 111.

At step 214, the POS terminal 111 will add the additional purchased item(s) to the customer's existing fuel transaction. In some embodiments, the POS terminal 111 will only add the additional item(s) to the transaction if the purchase price remains within the "overage" amount that the customer was pre-authorized to spend in steps 209-210. In some embodiments, the POS terminal 111 may display the additional items in real-time to a store clerk or other person monitoring the POS terminal 111. Advantageously, this allows the clerk to monitor the transaction and/or begin gathering the items purchased by the customer. In some embodiments, the additional purchased item(s) may be sent to a monitor other than POS terminal 111 (such as one or more video displays observable by store employees). In such embodiments, the store employees could monitor the purchased items and/or gather the purchased items for the customer.

In some embodiments, the POS terminal 111 may apply discounts to the customer's transaction based on the items purchased. For example, if the customer purchases a certain number of items from a given manufacturer, the POS terminal 111 may determine that the customer is eligible for a manufacturer's discount and apply the discount to the transaction.

After adding the additional purchased item(s) to the customer's transaction, the POS terminal 111 will then preferably send an acknowledgment message back to the web server 105, which will relay the message to the customer's mobile device 101. The app or web page on the mobile device 101 will preferably display a confirmation message to the customer that his purchased items were added to the transaction. It should be recognized that steps 213-214 may be repeated if the customer decides to purchase additional goods or services.

At step 215, fuel pump 112*a* will cease pumping fuel because (1) the customer has reached his pre-selected currency limit ($20, e.g.), (2) the customer has completely filled up his vehicle or otherwise manually terminated operation of the fuel pump 112*a*, or (3) the customer has reached the full pre-authorization limit ($150, e.g.). In some embodiments, the customer must operate a lever or other device of the fuel pump 112*a* to indicate that he is done pumping fuel. Thereafter, the fuel pump 112*a* will preferably send a message to the POS terminal 111 indicating that the customer has completed pumping fuel and providing details about the fuel transaction (such as the number of gallons pumped, the grade or type of fuel selected, the per-gallon price, and/or the total price). The POS terminal 111 will process this information and add the fuel to the customer's pending transaction. In some embodiments, the POS terminal 111 may apply a discount to the customer's fuel purchase based on the customer's loyalty account balance and/or points earned by the customer from playing a game on the mobile device 101 during the fuel pumping process. After adding the fuel to the transaction, the POS terminal 111 will preferably relay this transaction information to the web server 105, which will preferably relay the information to the customer's mobile device 101 to be displayed to the customer.

It should be noted that step 215 may be performed after, before, or simultaneously with steps 213-214. That is, the customer may finish selecting his additional item(s) for purchase while fuel is still pumping or the customer may continue selecting additional item(s) for purchase after he has completed pumping fuel.

At step 216, the customer is preferably presented with a summary of his transaction details before the transaction is finalized. Specifically, the web server 105 will preferably send a message to the customer's mobile device 101 containing the details of the customer's transaction. This information can then be displayed to the customer on his mobile device 101. For example, the customer's mobile device 101 may display the total dollar amount for the fuel he purchased, the number of gallons purchased, an itemized list of additional item(s) purchased (if any), any applicable sales tax or other taxes, and a total amount due. In some embodiments, the list of additional items may not be itemized. In some embodiments, the form of payment (such as a credit card name and/or masked credit card number) may be displayed to the customer.

At step 217, the customer may choose to finalize the transaction in some embodiments by using an input device on the mobile device 101. For example, after viewing a summary of the transaction on the display of the mobile device 101, the app or web browser on the customer's mobile device 101 may display a message to the customer asking if he is done purchasing non-fuel items. The customer may then touch a "yes" button on a touchscreen of the mobile device 101 indicating that he is done purchasing non-fuel items and is ready to finalize his transaction. The mobile device 101 will then preferably send a message to the web server 105 indicating that the customer wishes to finalize his transaction. The web server 105 will then preferably relay the message to the POS terminal 111.

In some embodiments, the mobile device 101 may display a countdown timer after the mobile device 101 receives a message from the web server 105 in step 215 indicating that the customer has completed pumping fuel. When the countdown timer reaches zero, the POS terminal 111 may automatically finalize the transaction without waiting to receive a message from the mobile device 101 or web server 105. In this manner, the finalization of the transaction can be ensured even if the customer does not expressly choose to finalize the transaction. In some embodiments, the countdown timer may be reset if the customer chooses to add additional non-fuel items to his transaction or otherwise interacts with the ordering app or web browser on his mobile device 101. For example, if the customer continues ordering additional items using the app or web browser on his mobile device 101, then the app or web browser may periodically send a "reset" message or "heartbeat" message to web server 105, said message being relayed to POS terminal 111, which will reset the countdown timer in response to receiving said message.

At step 218, the POS terminal 111 will begin finalizing the transaction after receiving the finalization message from the web server 105 (or after the transaction has timed-out.) The POS terminal 111 will then send a message to the payment server 110 to finalize the payment. After processing the payment, the payment server 110 will return confirmation of the finalized payment to the POS terminal 111. The POS terminal 111 will then finalize the customer's transaction.

At step 219, the POS terminal 111 will send a message to the web server 105 including information about the finalized transaction. Such information may include the transaction ID, the payment ID, the total amount paid, and/or the form of payment used. The web server 105 will preferably relay this information to the customer's mobile device 101.

At step 220, the customer's mobile device 101 will preferably display the details of the finalized transaction and/or display a message that the transaction has been finalized. In some embodiments, the customer may input on his mobile device 101 that he wishes to have a receipt for the transaction printed at the fuel pump 112a. In response, the app or web application on the customer's mobile device 101 will send a print request message to the web server 105, which will be relayed to the POS terminal 111. The POS terminal 111 will then send a message or signal to the fuel pump 112a to print out the receipt.

In the alternative, or in addition, the fuel pump 112a may display a message on a display of the fuel pump 112a asking if the customer desires a printed receipt. In response to said message, the customer may enter input on an input device of the fuel pump 112a indicating whether he wishes to have a printed receipt.

In some embodiments, the customer may input on his mobile device 101 that he wishes to have a receipt for the transaction emailed to his email account. In response, the app or webpage may send an email to the customer's email account. Alternatively, the app or webpage may relay the email request to the web server 105 which may relay the message to the POS terminal 111. Thereafter, the web server 105 or the POS terminal 111 may send an email to the customer's email account.

At step 221, the customer may pick up his purchased items inside the store or his purchased items may be brought to him by a store employee. If the customer purchased a service such as a car wash, then the customer may utilize his purchased service. In some embodiments, the customer may be required to scan a QR code inside the store using his mobile device 101 before he can pick up his purchased items and/or use his purchased services. This action will preferably cause the transaction on a video display to become highlighted, helping the store employee to link the order to the customer. In some embodiments, the transaction may require proof of age. The age verification process will preferably occur at POS terminal 111. The customer's driver's license is scanned, swiped or manually entered at POS terminal 111, and that driver's license becomes associated with the transaction.

Those of skill in the art will recognize that the aforedescribed embodiments are illustrative and that various modifications of the foregoing embodiments are possible. For example, in some embodiments, the POS terminal 111 may be resident on, or integrated with, the fuel pump 112a. In some embodiments, the fuel pump controller of fuel pump 112a may also comprise the POS terminal 111. In such embodiments, each of the fuel pumps 112a-112c may therefore contain separate POS terminals.

In some embodiments, the POS terminal 111 may comprise a traditional point-of-sale terminal, e.g., a point-of-sale terminal located inside the merchant's store comprising a video display, a cash drawer, a scanner, and/or other input means, along with software or hardware capable of processing purchase transactions. In other embodiments, the POS terminal 111 may comprise a system (including hardware and/or software) that is capable of processing purchase transactions but that is lacking a video display, cash drawer, scanner and/or other devices commonly found with traditional point-of-sale terminals. That is, the term "POS terminal" as used herein should be construed broadly and should not be construed to require the presence of a video display, cash drawer, scanner, or other input means.

In some embodiments, the POS terminal 111 and the payment server 110 may comprise a single system. In some embodiments, the POS terminal 111 and the web server 105 may comprise a single system. In some embodiments, the web server 105 and payment server 110 may comprise a single system. In some embodiments, the POS terminal 111, the web server 105, and the payment server 110 may comprise a single system.

In some embodiments, the communication paths between and among the mobile device 101, web server 105, POS terminal 111, and payment server 110 can be varied. For example, in some embodiments the mobile device 101 can communicate directly with the POS terminal 111 and/or the payment server 110 without the message being relayed through web server 105. Similarly, in some embodiments, web server 105 can communicate directly with payment server 110 without the message being relayed through the POS terminal 111.

Those of skill in the art will also recognize that the signals or messages "relayed" from one device to another device can be reformatted, supplemented, or truncated before the signal or message is relayed. For example, when the customer's mobile device sends a message containing order information to the web server 105 in step 213, the web server 105 may reformat that data, supplement the data, or truncate the data before relaying the message to the POS terminal 111. In such a manner, the web server 105 can perform any necessary data format translation between the mobile device 101 and the POS terminal 111. In addition, the web server 105 can supplement the data (by adding a transaction ID, e.g.) or remove superfluous data (such as the mobile device's IP address, e.g.) Therefore, it is to be understood that the "relaying" of signals or messages as described herein may involve the transformation of the signals or messages prior to their re-transmission to another device.

Those of skill in the art will also recognize that the steps described above with respect to the exemplary embodiments need not be carried out in the exact sequence as shown and that certain steps may be combined in alternate embodiments. In some embodiments, for example, step 204 may be combined into step 201 and step 205 may be combined into step 202. In such embodiments, the customer begins the transaction by scanning the QR code at the fuel pump 112a using his mobile device 101, selecting the amount of fuel for purchase ($10, e.g.), selecting the method of payment (mobile wallet, e.g.), and optionally selecting (or defaulting to) a loyalty account. The app or web page present on the mobile device 101 then makes a single call to the web server 105 to initiate the transaction in lieu of the two steps (steps 202 and 205) described above with respect of FIG. 2.

Accordingly, while the invention has been described with reference to the structures and processes disclosed, it is not confined to the details set forth, but is intended to cover such modifications or changes as may fall within the scope of the following claims.

What is claimed is:

1. A computer-implemented method for facilitating a transaction via a mobile device comprising:
receiving, by the mobile device, a request to purchase fuel from a fuel pump, the request including data captured in an image by an imaging device of the mobile device and extracted by processing of the captured data on the mobile device, the data uniquely identifying the fuel pump and at least one of general location data, a location identifier, and a merchant identifier;
transmitting a request from the mobile device via a network to cause activation of the fuel pump for the fuel to be purchased;
receiving, as input within a graphical user interface of the mobile device, a request to purchase an additional item;
allowing, by the mobile device, purchase of the fuel and the additional item in a single transaction;
receiving payment input within a user interface of the mobile device, the payment input including input identifying a payment method; and
providing content via a user interface of at least one of the mobile device and the fuel pump, the content identified based on data of the request.

2. The method of claim 1, further comprising:
receiving a request to scan a bar code associated with the fuel pump;
providing for scanning the bar code; and
identifying the fuel pump based at least in part on information associated with the scanned bar code.

3. The method of claim 1 further comprising:
providing for display of an indication of one or more additional items available for sale.

4. The method of claim 3, wherein providing for display of an indication of one or more additional items further comprises providing for display of an indication of at least one of an advertisement for one or more additional items, an interactive menu of one or more additional items, a static menu of one or more additional items, and a special offer for one or more additional items.

5. The method of claim 1, wherein the additional item is selected from the group consisting of a product and a service.

6. The method of claim 1, further comprising:
presenting one or more payment options for providing payment for the single transaction; and
receiving a selection of a payment option.

7. The method of claim 6, wherein the one or more payment options comprise at least one of providing payment via a mobile wallet and providing payment via an input device associated with the fuel pump.

8. The method of claim 7, wherein the selected payment option comprises providing payment via an input device associated with the fuel pump, and wherein the method further comprises:
transmitting a request for the fuel pump to receive payment for the single transaction via the input device.

9. The method of claim 1, further comprising:
enabling receipt of a request for a printed receipt to be delivered via a printer associated with the fuel pump; and
transmitting a print request message to the fuel pump to print the receipt.

10. A computer-implemented method for facilitating a transaction via a transaction device comprising:
receiving a request from a mobile device to purchase fuel from a fuel pump, the request including data uniquely identifying the fuel pump and at least one of general location data, a location identifier, and a merchant identifier, the data captured in an image by an imaging device of the mobile device and extracted by processing of the captured data on the mobile device, the data;

transmitting a request from the mobile device via a network to cause activation of the fuel pump for the fuel to be purchased;
receiving, as input within a graphical user interface of the mobile device, a request to purchase an additional item;
providing for purchase of the fuel and the additional item in a single transaction;
receiving payment input within a user interface of the mobile device, the payment input including input identifying a payment method; and
providing content via a user interface of at least one of the mobile device and the fuel pump, the content identified based on data of the request.

11. The method of claim 10, further comprising:
transmitting a message identifying one or more additional items available for sale.

12. The method of claim 11, wherein transmitting the message further comprises enabling transmission of the message to the mobile device for enabling display of the one or more additional items.

13. The method of claim 11, wherein transmitting the message further comprises enabling transmission of the message to the fuel pump for enabling display of the one or more additional items.

14. The method of claim 11, wherein the message identifying one or more additional items further comprises at least one of an advertisement for one or more additional items, an interactive menu of one or more additional items, a static menu of one or more additional items, and a special offer for one or more additional items.

15. The method of claim 10, wherein the additional item is selected from the group consisting of a product and a service.

16. The method of claim 10, further comprising:
receiving a request for a printed receipt to be delivered via a printer associated with the fuel pump; and
transmitting a print request message to the fuel pump to print the receipt.

17. The method of claim 10, further comprising:
receiving a request to pay for the single transaction via an interface associated with the fuel pump; and
transmitting a message to the fuel pump to request payment.

18. The method of claim 10, wherein the transaction device is integrated with the fuel pump.

19. The method of claim 10, wherein the transaction device comprises a point-of-sale device.

\* \* \* \* \*